April 22, 1969   R. E. LAKE ETAL   3,440,559
KRYPTON-XENON FLASH TUBE FOR PUMPING A RUBY LASER
Filed May 8, 1964

INVENTORS
Ronald Ernest Lake
and
Donald Rees
BY Baldwin & Wight
ATTORNEY 3,440,559
KRYPTON-XENON FLASH TUBE FOR
PUMPING A RUBY LASER
Ronald Ernest Lake and Donald Rees, Chelmsford, Essex,
England, assignors to English Electric Valve Company
Limited, London, England, a British company
Filed May 8, 1964, Ser. No. 366,011
Claims priority, application Great Britain, June 17, 1963,
23,943/63
Int. Cl. H01s 3/09; H01j 17/20, 61/16
U.S. Cl. 331—94.5     3 Claims

ABSTRACT OF THE DISCLOSURE

A ruby laser arrangement is provided in which the ruby laser is stimulated by a light source including a flash tube in which the filling is of xenon and krypton. From 25% and 50% of krypton and between 25% and 50% of xenon is envisaged but in preferred embodiments xenon predominates. In one embodiment the flash tube is straight and included within a reflector shaped to concentrate light upon the ruby laser while in another embodiment the flash tube is helical and encircles the ruby laser.

---

Figure 1:
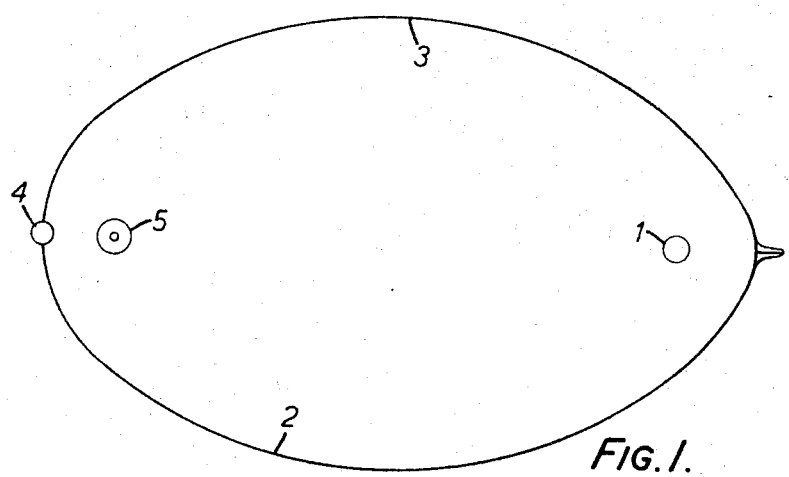

This invention relates to laser arrangements and to light stimulating sources therefor and more specifically to the light stimulation of lasers of the kind in which the laser element is an impregnated ruby crystal body. For brevity of description lasers of this kind will hereinafter be referred to simply as ruby lasers.

As is well known a ruby laser requires relatively large light powers to stimulate it and large, powerful flash tubes have hitherto been used to provide the considerable minimum light powers necessary to stimulate such lasers. Because of the very low efficiency of ruby lasers this is a serious defect and substantial advantages would follow the adoption of any expedient which would reduce the size and power of light sources employed for ruby laser stimulation. The present invention seeks to achieve this end.

In present day general practice xenon filled flash tubes, which may be regarded as developments of the flash tubes employed in the practice of photography, are used for ruby laser stimulation. Xenon has been chosen for the gas filling of flash tubes for this purpose because it is known to give, in a given tube, the highest light intensity of any gas conveniently commercially available. Nevertheless a xenon filled gas tube is not as effectively efficient a light stimulator for a ruby laser as is desirable. This is because the emission spectrum of xenon does not match the absorption spectrum of ruby, which has two peak absorption regions in the visible spectrum at approximately 5700 and 4200 angstroms whereas zenon has emission peaks at approximately 4671, 4624 and 4500 angstroms.

According to a feature of this invention, a flash tube for light stimulation of a ruby laser has a gas filling of xenon and krypton.

According to a feature of this invention a ruby laser arrangement includes a ruby laser and, in combination therewith, a stimulating light source consisting of a flash tube having a gas filling of xenon and krypton.

The proportion of xenon to krypton in the gas filling is not critical but experiment indicates that optimum results are probably obtainable with a mixture in which the krypton content is between 25% and 50% of the whole. A tube with a filling of 50% krypton and 50% xenon has been found to be a substantial improvement over a known xenon filled tube and experiment indicates that still better results follow reduction of the krypton content substantially below 50%.

A tube in accordance with this invention may have the usual two internally spaced electrodes for the application of energy and the usual external winding over its envelope for the application of a high voltage pulse. The tube may be, again in accordance with normal practice, of any of a variety of shapes e.g. straight or helical. A straight tube may be arranged in accordance with practice known per se, inside an internally reflecting reflector shaped to concentrate light from the tube upon a ruby laser which is also inside the reflector. A helical tube may be arranged, also as known per se, to encircle a ruby laser lying along its axis.

Krypton has emission peaks at approximately 5870 and 5570 angstroms, the 5870 line angstrom peak coinciding with the second absorption peak of chromium doped ruby.

The practical improvement obtainable by this invention is very substantial. Experiments already made indicate that a reduction in the neighborhood of 25% of the energy required for ruby excitation is obtainable with a tube in accordance with this invention as compared with a known xenon filled tube.

Figure 2:
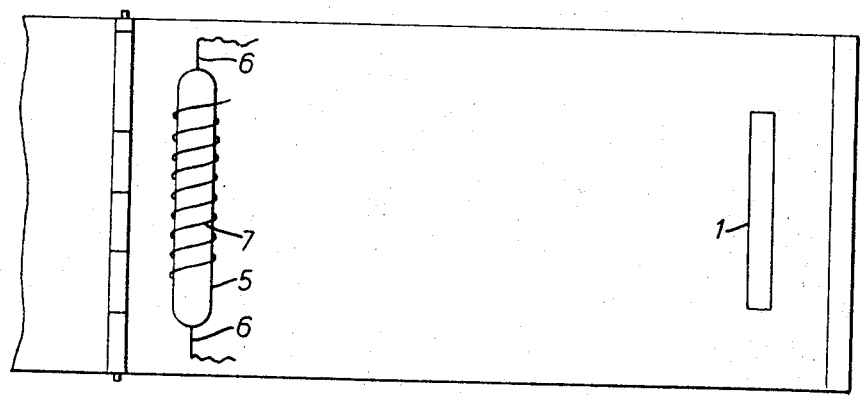

The invention is illustrated in the accompanying schematic drawings in which FIGURE 1 is an end view of one embodiment; FIGURE 2 is a view at right angles to FIGURE 1 with the reflector opened; and FIGURE 3 shows a variant.

Referring to FIGURE 1, a ruby laser 1 is mounted to lie in one focal line of an internally reflecting reflector of elliptical section and consisting of a base part 2 and a top 3 (both half ellipses in section) hinged to one another at 4 to form an openable box. In the other focal line of the reflector is a flash tube 5 which, in the example illustrated, is a straight tube. The tube 5 is, in accordance with this invention, filled with a mixture of xenon and krypton, the kryton constituent beging rather under 50% of the whole. Apart from its gas filling the tube is of generally known construction with connections 6 to internal electrodes (not shown) one at each end of the tube and a winding 7 over the tube envelope. To quote practical, but not limiting figures, an energy source of, say, 1000 joules may be applied between the electrode 6 and the tube flashed by applying a pulse of say 10,000 volts to the winding 7 When the tube flashes, light therefrom is concentrated by the reflector upon the laser 1.

Figure 3:
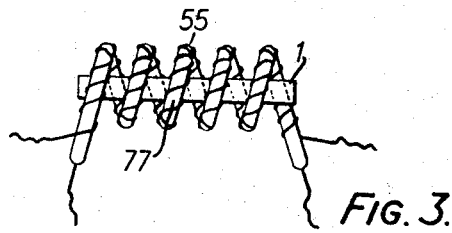

In the modification shown in FIGURE 3, the flash tube is of helical form as known per se and the laser 1 lies along its axis. The tube is referenced 55 in FIGURE 3 and the flashing winding which is wound over its helical envelope is referenced 77.

We claim

1. A ruby laser arrangement including a ruby laser having a light absorption spectrum exhibiting at least one light absorption peak for light of a predetermined wavelength and in combination therewith a stimulating light source including a flash tube having a gas filling of xenon and krypton and having a light emission spectrum exhibiting at least one emission peak at substantially said predetermined wavelength.

2. A ruby laser arrangement according to claim 1 wherein said ruby laser light absorption spectrum exhibits increased absorption at a wavelength of approximately 5870 angstroms and wherein said krypton provides a light emission peak in said emission spectrum at wavelengths of approximately 5870 angstroms.

3. A ruby laser arrangement according to claim 1 wherein the krypton content is between 25% and 50% of the whole filling.

References Cited

UNITED STATES PATENTS

| | | | |
|---|---|---|---|
| 2,791,727 | 5/1957 | Schutz et al. | |
| 3,229,223 | 1/1966 | Miller | 350—150 |
| 2,567,369 | 10/1951 | Edwards et al. | 313—226 |

OTHER REFERENCES

Electronics, Aug. 4, 1961, pp. 62 and 64.

JEWELL H. PEDERSEN, *Primary Examiner.*

E. BAUER, *Assistant Examiner.*

U.S. Cl. X.R.

313—226